United States Patent
Li (10) Patent No.: US 11,139,662 B2
(45) Date of Patent: Oct. 5, 2021

(54) BALANCE CIRCUITS FOR BATTERY CELLS

(71) Applicant: O2Micro, Inc., Santa Clara, CA (US)

(72) Inventor: Guoxing Li, Sunnyvale, CA (US)

(73) Assignee: O2Micro Inc., Santa Clara, CA (US)

( * ) Notice: Subject to any disclaimer, the term of this patent is extended or adjusted under 35 U.S.C. 154(b) by 216 days.

(21) Appl. No.: 16/360,538

(22) Filed: Mar. 21, 2019

(65) Prior Publication Data

US 2019/0312444 A1 Oct. 10, 2019

(30) Foreign Application Priority Data

Apr. 9, 2018 (GB) .................................. 1805881

(51) Int. Cl.
*H02J 7/00* (2006.01)

(52) U.S. Cl.
CPC .......... *H02J 7/0016* (2013.01); *H02J 7/0021* (2013.01)

(58) Field of Classification Search
CPC ........................................................ H02J 7/00
See application file for complete search history.

(56) References Cited

U.S. PATENT DOCUMENTS

2010/0289453 A1 11/2010 Firehammer et al.
2012/0286578 A1* 11/2012 Uno ...................... H02J 7/0024
307/77

FOREIGN PATENT DOCUMENTS

| CN | 101872971 A | 10/2010 |
|---|---|---|
| CN | 103036226 A | 4/2013 |
| CN | 105958570 A | 9/2016 |
| CN | 106240391 A | 12/2016 |
| CN | 205945156 U | 2/2017 |
| CN | 106786927 A | 5/2017 |
| EP | 2827468 A1 | 1/2015 |
| KR | 1020180013569 A | 2/2018 |

OTHER PUBLICATIONS

Tan Xiaojun, "Diandong Qiche Dongli Dianchi Guanli Xitong Sheji," published by "Sun Yat-sen University Press," on Oct. 31, 2011, front matter pages and p. 126.
English Summary for p. 126 of "Diandong Qiche Dongli Dianchi Guanli Xitong Sheji".

* cited by examiner

*Primary Examiner* — Robert Grant (57) ABSTRACT

A balance circuit for a set of battery cells includes a set of switch circuits and control circuitry coupled to the switch circuits. Each switch circuit of the switch circuits is coupled to a corresponding battery cell of the battery cells, and enables a bypass current to flow out a positive terminal of the corresponding battery cell if the switch circuit is turned on. The switch circuit includes a first switch having a first diode and a second switch having a second diode reversely coupled to the first diode. The second switch disables the bypass current if the second switch is turned off. The control circuitry balances the battery cells by controlling the switch circuits.

20 Claims, 9 Drawing Sheets

BALANCE CIRCUITS FOR BATTERY CELLS

RELATED APPLICATION

This application claims benefit under 35 U.S.C. § 119(a) to Application No. GB1805881.8, filed with the United Kingdom Intellectual Property Office on Apr. 9, 2018, hereby incorporated herein by reference in its entirety.

BACKGROUND

Figure 1A:
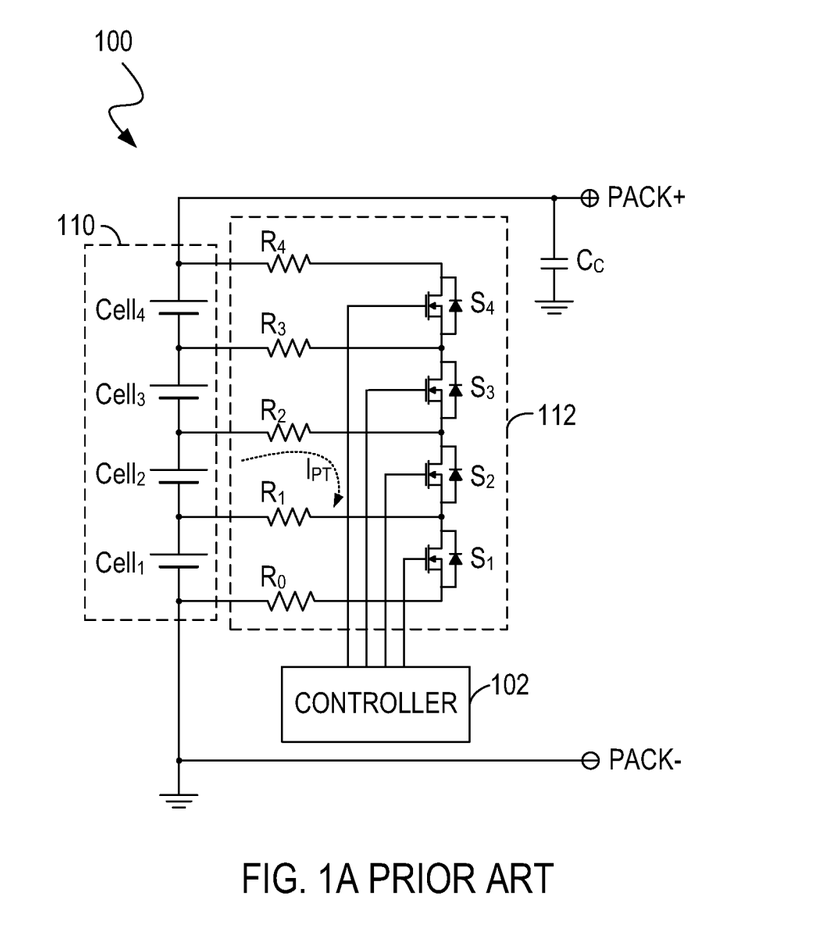
FIG. 1A illustrates a battery pack including a conventional balance circuit for a set of battery cells.

FIG. 1A illustrates a battery pack 100 including a conventional balance circuit 112 for a set of battery cells 110. The balance circuit 112 includes current limit resistors $R_0$, $R_1$, $R_2$, $R_3$ and $R_4$, switches $S_1$, $S_2$, $S_3$ and $S_4$, and a controller 102. The controller 102 monitors cells voltages of the battery cells 110 and balances the battery cells 110 based on the monitored information. For example, during a charging process, if a battery cell $Cell_M$ (M=1, 2, 3 or 4) of the battery cells 110 has a cell voltage greater than a balance threshold, then the controller 102 turns on a corresponding switch $S_M$ (M=1, 2, 3 or 4) to bypass a portion $I_{PT}$ of the charging current of the battery cell $Cell_M$, and therefore the rate of increase of the cell voltage of the battery cell $Cell_M$ is lower than that of the other battery cells. As another example, if a battery cell $Cell_N$ (N=1, 2, 3 or 4) has a cell voltage greater than the cell voltages of the other battery cells by an amount that exceeds a voltage reference, then the controller 102 turns on a corresponding switch $S_N$ (N=1, 2, 3 or 4) to bypass a portion $I_{PT}$ of the charging current of the battery cell $Cell_N$. As a result, differences between the cell voltages of the battery cells 110 are reduced, and therefore the battery cells 110 are balanced.

However, the conventional balance circuit 112 has some shortcomings. For example, if a battery cell $Cell_X$ (X=1, 2, 3 or 4) of the battery cells 110 is reversely connected to the other battery cells, then a body diode of the switch $S_X$ (X=1, 2, 3 or 4) is turned on to cause a leakage current $I_{RV}$ to discharge the battery cell $Cell_X$. The leakage current $I_{RV}$ flowing through the body diode may generate enough heat to damage the balance circuit 112 and/or damage the integrated circuit (IC) package that includes the balance circuit 112. As another example, if a battery cell, e.g., $Cell_4$, of the battery cells 110 is disconnected from the balance circuit 112, then a body diode of the switch $S_4$ is turned on, which causes a leakage current to flow from the battery cells $Cell_1$, $Cell_2$ and $Cell_3$, through the body diode of the switch $S_4$, to charge a filter capacitor $C_C$ that is coupled to a positive terminal PACK+ of the battery pack 100. That leakage current is relatively large and may damage the switch $S_4$.

Figure 1B:
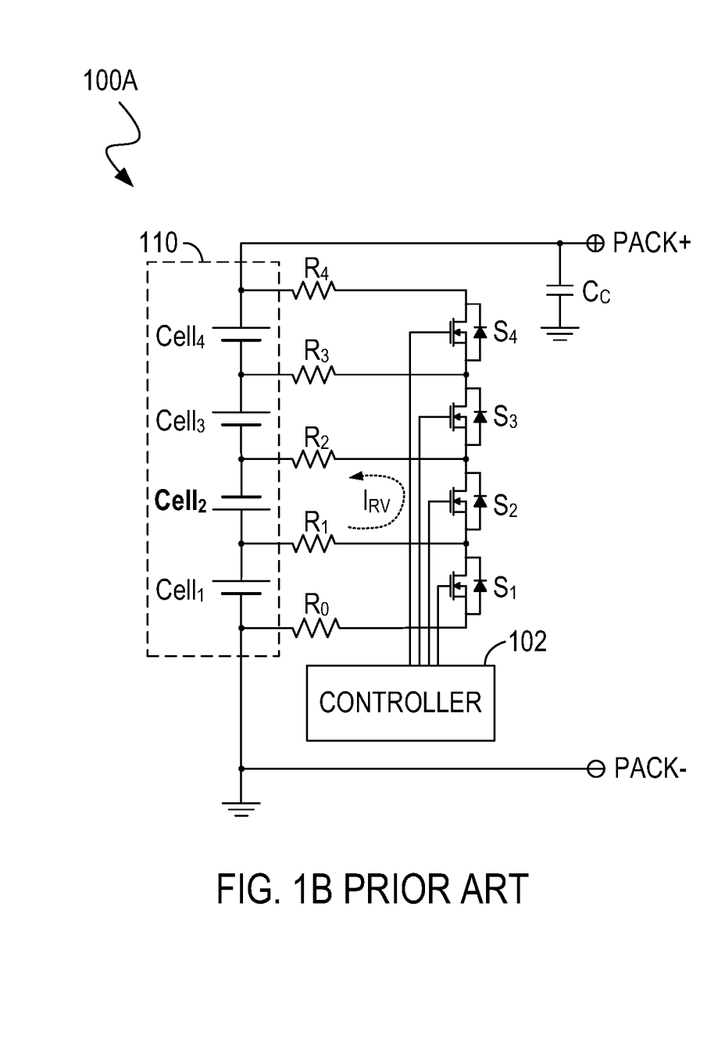
FIG. 1B illustrates a battery pack including a conventional balance circuit, in which a battery cell of a set of battery cells is reversely connected to the other battery cells.

More specifically, FIG. 1B illustrates a battery pack 100A including the conventional balance circuit 112, in which a battery cell $Cell_2$ of the battery cells 110 is reversely connected to the other battery cells. As shown in FIG. 1B, the reversely connected battery cell $Cell_2$ applies a forward-bias voltage to the body diode of the switch $S_2$, and therefore the body diode of the switch $S_2$ is turned on to discharge the battery cell $Cell_2$. The leakage current $I_{RV}$ of the battery cell $Cell_2$ not only may over-discharge the battery cell $Cell_2$ but also may generate enough heat to damage the IC package.

Figure 1C:
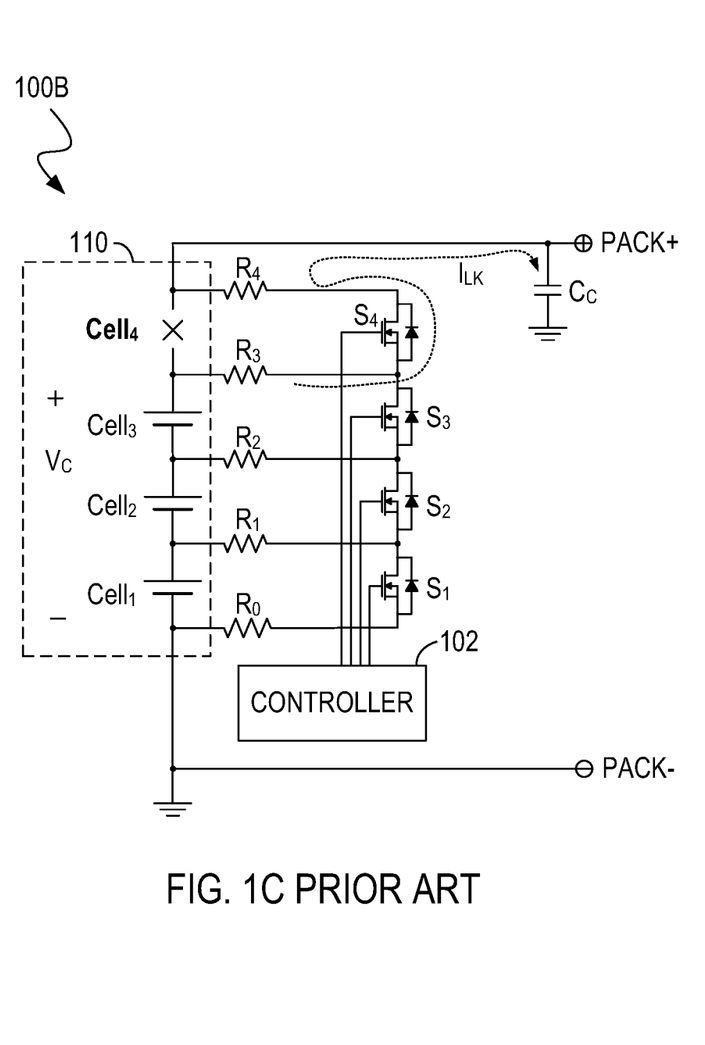
FIG. 1C illustrates a situation in which a battery cell of a set of battery cells is disconnected from a conventional balance circuit.

FIG. 1C illustrates a situation in which a battery cell $Cell_4$ of the battery cells 110 is disconnected from the conventional balance circuit 112. For example, during assembly of the battery pack 100B, the battery cells $Cell_1$, $Cell_2$, $Cell_3$ and $Cell_4$ are supposed to be connected to (e.g., welded to) the balance circuit 112, one by one, e.g., from the bottom to the top. However, if the battery cells $Cell_1$, $Cell_2$ and $Cell_3$ are connected to the switches $S_1$, $S_2$, and $S_3$, but the battery cell $Cell_4$ is not connected to the switch $S_4$, a voltage $V_C$ across the series-coupled battery cells $Cell_1$, $Cell_2$ and $Cell_3$ will be applied to the switch $S_4$, the resistor $R_4$, and the capacitor $C_C$. If the voltage $V_C$ is relatively large, the body diode of the switch $S_4$ will be forward biased, e.g., turned on, and a leakage current $I_{LK}$ flowing from the battery cells $Cell_1$, $Cell_2$ and $Cell_3$, through the body diode of the switch $S_4$ and the resistor $R_4$, to charge the capacitor $C_C$ will also be relatively large. A relatively large leakage current $I_{LK}$ may cause damage to the switch $S_4$. As another example, when the battery pack 100B is finally assembled into a package, one or more of the battery cells 110 may have a loose connection with the balance circuit 112. If a battery cell, e.g., $Cell_3$, has a loose connection with the balance circuit 112, then a voltage across the series-coupled battery cells $Cell_1$ and $Cell_2$ will be applied to the switches $S_3$ and $S_4$, the resistor $R_4$, and the capacitor $C_C$. Similar to the other example, the body diodes of the switches $S_3$ and $S_4$ will be turned on and a relatively large leakage current will flow through the body diodes to charge the capacitor $C_C$, which may cause damage to the switches $S_3$ and $S_4$.

Thus, a balance circuit that addresses the abovementioned shortcomings would be beneficial.

SUMMARY

In an embodiment, a balance circuit for a set of battery cells includes a set of switch circuits and control circuitry coupled to the switch circuits. Each switch circuit of the switch circuits is coupled to a corresponding battery cell of the battery cells, and can enable a bypass current to flow from a positive terminal of the corresponding battery cell if the switch circuit is turned on. The switch circuit includes a first switch having a first diode, and also includes a second switch having a second diode reversely coupled to the first diode. The second switch can disable the bypass current if the second switch is turned off. The control circuitry can balance the battery cells by controlling the switch circuits.

BRIEF DESCRIPTION OF THE DRAWINGS

Features and advantages of embodiments of the claimed subject matter will become apparent as the following detailed description proceeds, and upon reference to the following drawings, wherein like numerals depict like parts.

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 2A:
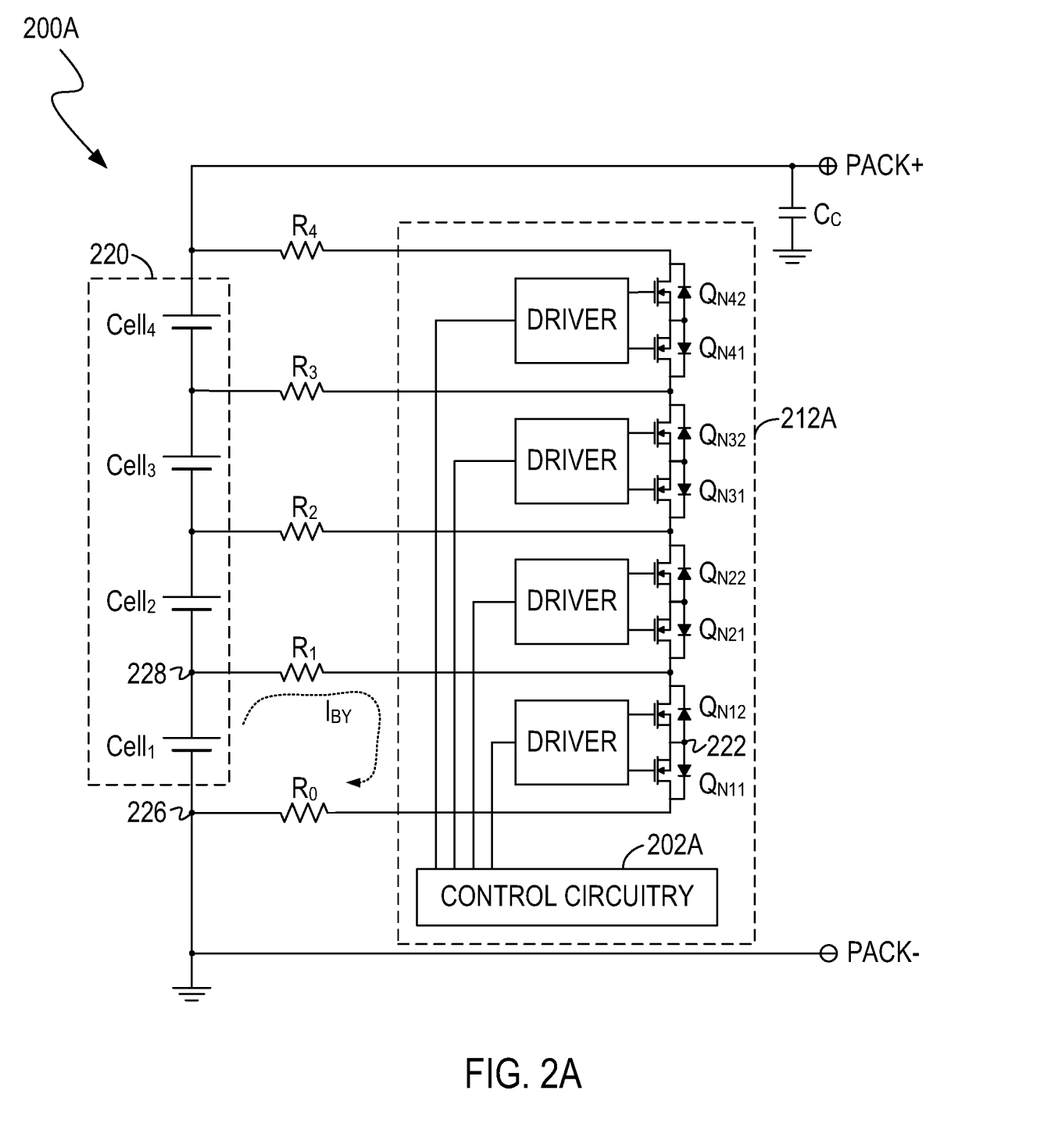
FIG. 2A illustrates a circuit diagram of an example of a balance circuit for a set of battery cells in a battery pack, in an embodiment of the present invention.

FIG. 2A illustrates a circuit diagram of an example of a balance circuit 212A for a set of battery cells 220 in a battery pack 200A, in an embodiment of the present invention. In an embodiment, the battery cells 220 are coupled in series. Although FIG. 2A shows four battery cells in the battery pack 200A, the invention is not so limited. In another embodiment, the battery pack 200A can include another number, e.g., 2, 3, 5, 6 or 7, of battery cells. In an embodiment, the battery cells 220 include rechargeable battery cells such as lithium-ion battery cells. In other embodiments, the battery cells 220 may include nickel-cadmium battery cells, lead-acid battery cells, solar battery cells, or the like.

In an embodiment, the balance circuit 212A includes a set of switch circuits and control circuitry 202A. Each switch circuit is coupled to a corresponding battery cell of the battery cells 220, and can enable a bypass current to flow from a positive terminal of the corresponding battery cell if the switch circuit is turned on. Additionally, each switch circuit includes a first switch having a first body diode, and also includes a second switch having a second body diode reversely coupled to the first body diode. If the second switch if turned off, the second switch can disable the bypass current. As used herein, "a second diode is reversely coupled to a first diode" means that either both the cathodes of the diodes are coupled to a connection node between the cathodes or both the anodes of the diodes are coupled to a connection node between the anodes.

For example, as shown in FIG. 2A, the switch circuit coupled to the battery cell $Cell_1$ (hereinafter, switch circuit $Q_{N11}$-$Q_{N12}$) includes a first switch $Q_{N11}$ having a first body diode, and also includes a second switch $Q_{N12}$ having a second body diode. In an embodiment, the anode of the first body diode and the anode of the second body diode are coupled to a connection node 222 between the two anodes (between the first and second body diodes). This kind of switch circuit may be referred to as a "back-to-back switch." If the first switch $Q_{N11}$ and the second switch $Q_{N12}$ are turned on, then the switch circuit $Q_{N11}$-$Q_{N12}$ is turned on, and a bypass current $I_{BY}$ can be enabled to flow from a positive terminal 228 of the battery cell $Cell_1$, through the switch circuit $Q_{N11}$-$Q_{N12}$, to a negative terminal 226 of the battery cell $Cell_1$. In a charging process of the battery cells 220, the bypass current $I_{BY}$ can reduce the rate of increase of a cell voltage $V_{CELL1}$ of the battery cell $Cell_1$. If the battery cells 220 are neither charging nor discharging, then the bypass current $I_{BY}$ can discharge the battery cell $Cell_1$ to reduce the cell voltage $V_{CELL1}$. If the second switch $Q_{N12}$ is turned off, then the second switch $Q_{N12}$ can disable/block the bypass current $I_{BY}$. Similarly, if the first switch $Q_{N11}$ is turned off, then the first switch $Q_{N11}$ can disable/block a current flowing from the terminal 226 to the terminal 228. If the first switch $Q_{N11}$ and the second switch $Q_{N12}$ are turned off, then no current flows through the switch circuit $Q_{N11}$-$Q_{N12}$. In an embodiment, the circuit structures and functions of the switch circuits $Q_{N21}$-$Q_{N22}$, $Q_{N31}$-$Q_{N32}$, and $Q_{N41}$-$Q_{N42}$, coupled to the battery cells $Cell_2$, $Cell_3$ and $Cell_4$ respectively, are similar to that of the switch circuit $Q_{N11}$-$Q_{N12}$. The switches $Q_{N21}$, $Q_{N31}$ and $Q_{N41}$ can be referred to as the first switches of the switch circuits $Q_{N21}$-$Q_{N22}$, $Q_{N31}$-$Q_{N32}$, and $Q_{N41}$-$Q_{N42}$, respectively. The switches $Q_{N22}$, $Q_{N32}$ and $Q_{N42}$ can be referred to as the second switches of the switch circuits $Q_{N21}$-$Q_{N22}$, $Q_{N31}$-$Q_{N32}$, and $Q_{N41}$-$Q_{N42}$, respectively.

Accordingly, in the example of FIG. 2A, if a battery cell $Cell_K$ (e.g., K=1, 2, 3 or 4) is reversely connected to the other battery cells, then a leakage current (e.g., similar to the leakage current $I_{RV}$ mentioned in relation to FIG. 1B) of the battery cell $Cell_K$ can be blocked/disabled by turning off the first switch (e.g., $Q_{N11}$, $Q_{N21}$, $Q_{N31}$ and $Q_{N41}$) of the corresponding switch circuit. For example, if the battery cell $Cell_2$ is reversely connected to the battery cells $Cell_1$, $Cell_3$ and $Cell_4$, then turning off the switch $Q_{N21}$ can disable/block a leakage current of the battery cell $Cell_2$. Because all the switches $Q_{N11}$, $Q_{N12}$, $Q_{N21}$, $Q_{N22}$, $Q_{N31}$, $Q_{N32}$, $Q_{N41}$ and $Q_{N42}$ are initially off, the balance circuit 212A and/or the IC package that includes the balance circuit 212A can be protected from damage by the leakage current $I_{RV}$.

Additionally, in an embodiment, the battery pack 200A includes a capacitor $C_C$ coupled to a positive terminal PACK+ of the battery pack 200A. The capacitor $C_C$ can filter out, e.g., voltage spikes and/or current spikes, at the terminal PACK+. In an embodiment, if a top battery cell, e.g., $Cell_4$, of the battery cells 220 is disconnected from or has a loose connection with a top switch circuit, e.g., $Q_{N41}$-$Q_{N42}$, of the switch circuits, then a current flowing from a battery cell $Cell_3$ that is adjacent to the top battery cell $Cell_4$ to charge the capacitor $C_C$ can be blocked because the top switch circuit $Q_{N41}$-$Q_{N42}$ is initially turned off. As a result, the balance circuit 212A can protect the switch circuit $Q_{N41}$-$Q_{N42}$ from being damaged by a relatively large leakage current, e.g., similar to the leakage current $I_{LK}$ mentioned in relation to FIG. 1C, from the battery cells $Cell_1$, $Cell_2$ and $Cell_3$. Similarly, in an embodiment, if a battery cell below the top battery cell (e.g., the battery cell $Cell_3$) is disconnected from or has a loose connection with the switch circuit $Q_{N31}$-$Q_{N32}$, then a current flowing from the battery cell $Cell_2$ to charge capacitor $C_C$ can be blocked because the switch circuit $Q_{N31}$-$Q_{N32}$ and/or the switch circuit $Q_{N41}$-$Q_{N42}$ are initially turned off. Thus, the balance circuit 212A can protect the switch circuits $Q_{N31}$-$Q_{N32}$ and $Q_{N41}$-$Q_{N42}$.

Moreover, in an embodiment, the control circuitry 202A can balance the battery cells 220 by controlling, e.g., selectively turning on or off, the switch circuits $Q_{N11}$-$Q_{N12}$, $Q_{N21}$-$Q_{N22}$, $Q_{N31}$-$Q_{N32}$, and $Q_{N41}$-$Q_{N42}$, thereby extending the battery life of the battery cells. For example, the control circuitry 202A can monitor a status, e.g., cell voltages, of the battery cells 220. If the control circuitry 202A detects that a battery cell $Cell_Q$ (e.g., Q=1, 2, 3 or 4) of the battery cells 220 has a cell voltage greater than a balance reference, then the control circuitry 202A turns on a corresponding switch circuit of the switch circuits by turning on the first switch and the second switch in the corresponding switch circuit. In an embodiment, the balance reference is a preset voltage reference. In another embodiment, the balance reference is determined by a minimum cell voltage of the cell voltages of the battery cells 220. For example, the balance reference can be equal to the minimum cell voltage plus a preset voltage. In yet another embodiment, the balance reference is determined by an average voltage of the cell voltages of the battery cells 220. As a result, the battery cells 220 can be balanced.

In an embodiment, the switches $Q_{N11}$, $Q_{N12}$, $Q_{N21}$, $Q_{N22}$, $Q_{N31}$, $Q_{N32}$, $Q_{N41}$ and $Q_{N42}$ of the switch circuits are metal-oxide-semiconductor field-effect transistors (MOSFETs). In one such embodiment, the connection node 222 between the anode of the body diode of the first MOSFET $Q_{N11}$ and the anode of the body diode of the second MOSFET $Q_{N12}$ includes a connection node between a source of the first MOSFET $Q_{N11}$ and a source of the second MOSFET $Q_{N12}$.

Figure 2B:
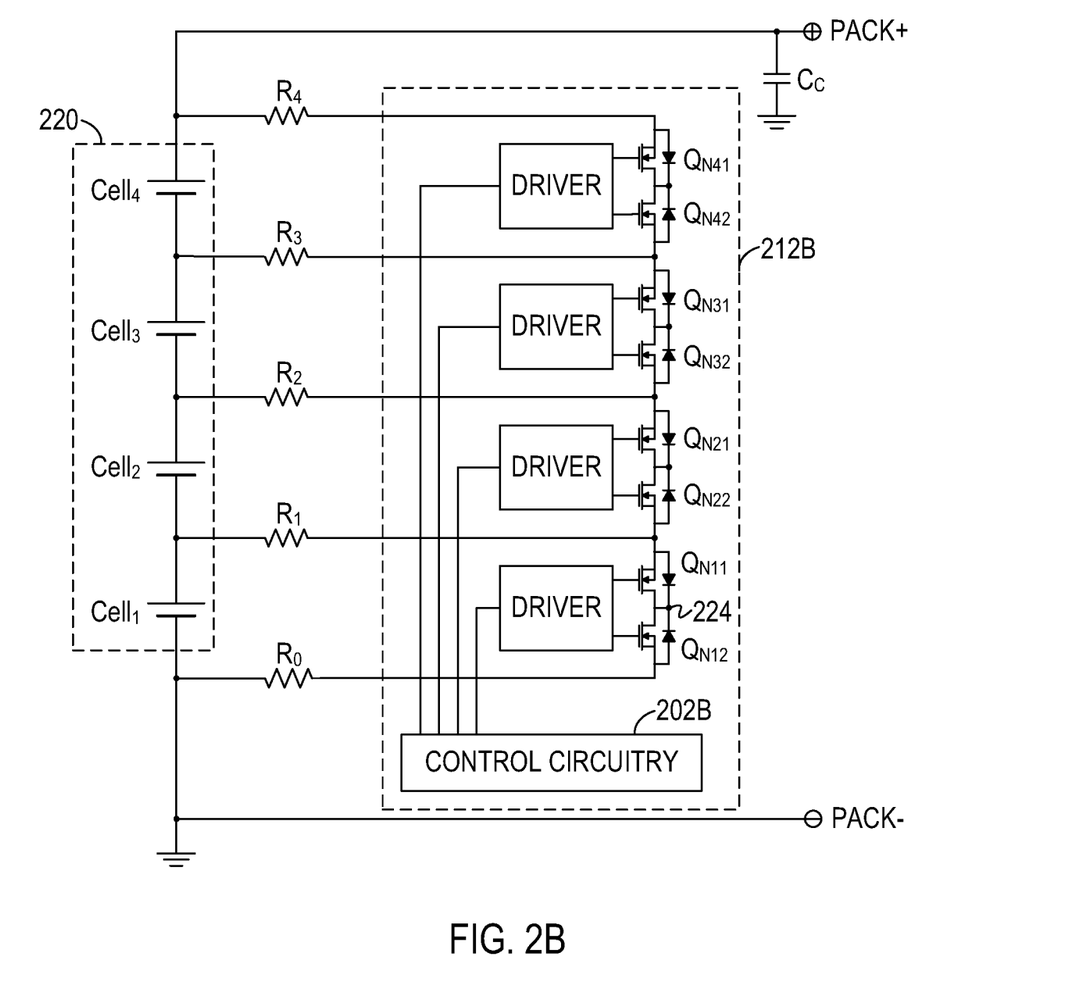
FIG. 2B illustrates a circuit diagram of an example of a balance circuit for a set of battery cells in a battery pack, in an embodiment of the present invention.
Figure 2C:
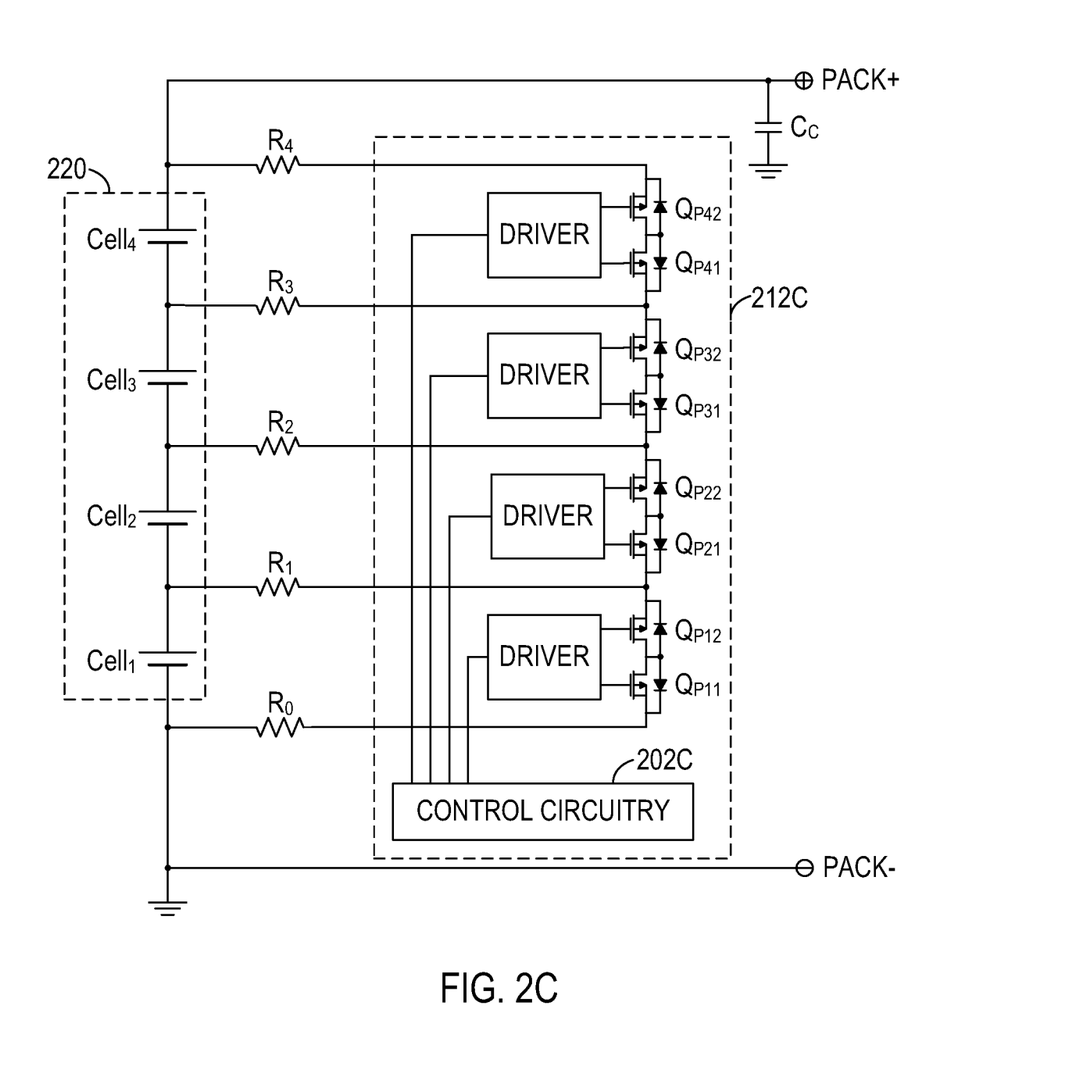
FIG. 2C illustrates a circuit diagram of an example of a balance circuit for a set of battery cells in a battery pack, in an embodiment of the present invention.
Figure 2D:
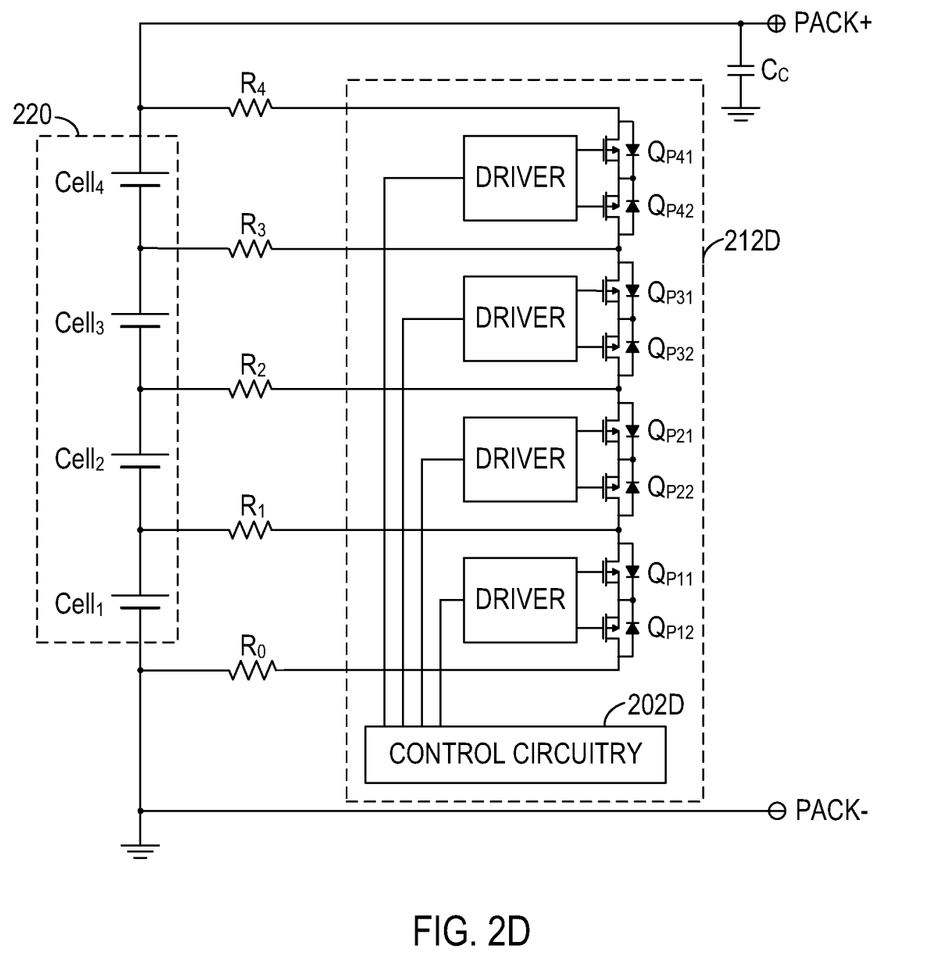
FIG. 2D illustrates a circuit diagram of an example of a balance circuit for a set of battery cells in a battery pack, in an embodiment of the present invention.

In the example of FIG. 2A, anodes of the body diodes of each switch circuit of the switch circuits are coupled to a corresponding connection node. However, the invention is not so limited. In other embodiments, e.g., as shown in FIG. 2B and FIG. 2D, cathodes of the body diodes of each switch circuit of the switch circuits are coupled to a corresponding connection node between the cathodes. For example, in FIG. 2B, the cathode of the body diode of the first switch $Q_{N11}$ and the cathode of the body diode of the second switch $Q_{N12}$ are coupled to a connection node 224 between the cathodes.

Additionally, in the example of FIG. 2A, the switches in the switch circuits include n-channel MOSFETs. However, the invention is not so limited. In other embodiments, the switches in the switch circuits include p-channel MOSFETs, e.g., as shown in FIG. 2C and FIG. 2D.

In the examples of FIG. 2A, FIG. 2B, FIG. 2C and FIG. 2D, each switch circuit of the switch circuits includes a first MOSFET and a second MOSFET. The switch circuit can be turned on by turning on both the MOSFETs, and power consumption of the switch circuit is relatively small due to the low-power consumption feature of MOSFETs. However, the invention is not so limited. In other embodiments, the switch circuit includes a transistor such as a MOSFET and a PN junction diode.

Figure 3A:
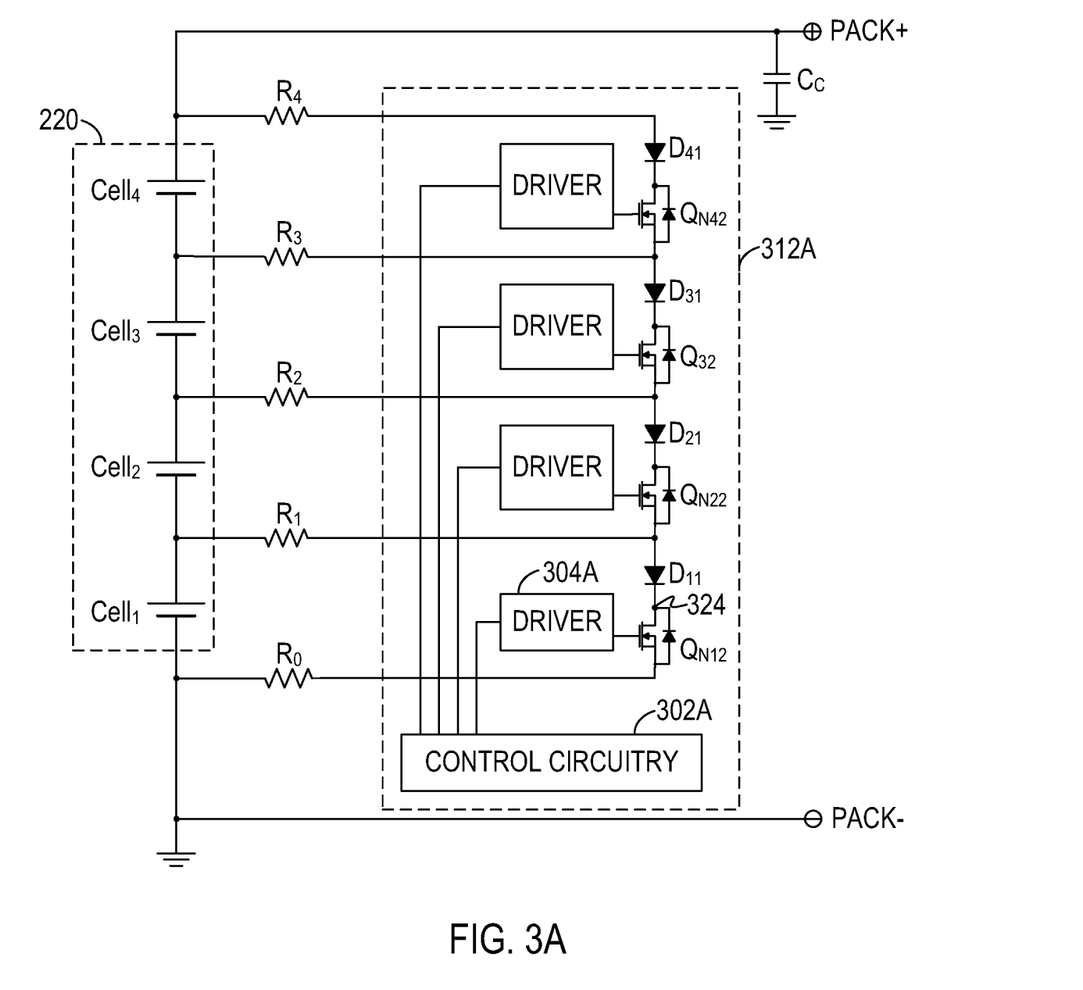
FIG. 3A illustrates a circuit diagram of an example of a balance circuit for a set of battery cells in a battery pack, in an embodiment of the present invention.

By way of example, as shown in FIG. 3A, the switch circuit (hereinafter, switch circuit $Q_{N12}$-$D_{11}$) coupled to the battery cell $Cell_1$ includes a transistor $Q_{N12}$ and a diode $D_{11}$, e.g., a PN junction diode. In an embodiment, the transistor $Q_{N12}$ can function as a switch under control of the control circuitry 302A, and the diode $D_{11}$ can function as a switch under control of the transistor $Q_{N12}$. In the example of FIG. 3A, the transistor $Q_{N12}$ includes an n-channel MOSFET. Thus, the control circuitry 302A can control the driver circuit 304A to pull up a voltage at the gate terminal of the transistor $Q_{N12}$ to turn on the transistor $Q_{N12}$, or to pull down the voltage at the gate terminal of the transistor $Q_{N12}$ to turn off the transistor $Q_{N12}$. If the transistor $Q_{N12}$ is turned on, then the battery cell $Cell_1$ can apply a forward bias voltage to the diode $D_{11}$, through the resistors $R_0$ and $R_1$ and the transistor $Q_{N12}$, to turn on the diode $D_{11}$. The switch circuit $Q_{N12}$-$D_{11}$ can also be turned on. If the transistor $Q_{N12}$ is turned off, then the diode $D_{11}$, as well as the switch circuit $Q_{N12}$-$D_{11}$, can be turned off.

The diode $D_{11}$ can be referred to as a first switch of the switch circuit $Q_{N12}$-$D_{11}$, and the transistor $Q_{N12}$ can be referred to as a second switch of the switch circuit $Q_{N12}$-$D_{11}$. In an embodiment, the circuit structures and functions of the switch circuits $Q_{N22}$-$D_{21}$, $Q_{N32}$-$D_{31}$, and $Q_{N42}$-$D_{41}$, coupled to the battery cells $Cell_2$, $Cell_3$ and $Cell_4$ respectively, are similar to that of the switch circuit $Q_{N12}$-$D_{11}$. The diodes $D_{21}$, $D_{31}$ and $D_{41}$ can be referred to as the first switches of the switch circuits $Q_{N22}$-$D_{21}$, $Q_{N32}$-$D_{31}$, and $Q_{N42}$-$D_{41}$, respectively. The transistors $Q_{N22}$, $Q_{N32}$ and $Q_{N42}$ can be referred to as the second switches of the switch circuits $Q_{N22}$-$D_{21}$, $Q_{N32}$-$D_{31}$, and $Q_{N42}$-$D_{41}$, respectively.

In an embodiment, the diodes $D_{11}$, $D_{21}$, $D_{31}$ and $D_{41}$ are unidirectional conducting devices, and they block currents flowing from their cathodes to their anodes. Thus, if a battery cell $Cell_K$ (e.g., K=1, 2, 3 or 4) is reversely connected to the other battery cells, the diode $D_{K1}$ can block a leakage current, e.g., similar to the leakage current $I_{RV}$ mentioned in relation to FIG. 1B, flowing from the battery cell $Cell_K$. Thus, the balance circuit 312A and/or the IC package that includes the balance circuit 312A can be protected from being damaged by the leakage current $I_{RV}$ mentioned in relation to FIG. 1B.

Additionally, in an embodiment, if the top battery cell $Cell_4$ of the battery cells 220 is disconnected from or has a loose connection with the top switch circuit $Q_{N42}$-$D_{41}$, the diode $D_{41}$ can block a leakage current, e.g., similar to the leakage current $I_{LK}$ mentioned in relation to FIG. 1C, flowing from the battery cells $Cell_1$, $Cell_2$ and $Cell_3$ to the capacitor $C_C$. Thus, the switch circuit $Q_{N42}$-$D_{41}$ can be protected from being damaged by the leakage current $I_{LK}$. Similarly, if a battery cell below the top cell (e.g., the battery cell $Cell_3$) is disconnected from or has a loose connection with the switch circuit $Q_{N32}$-$D_{31}$, the diode $D_{31}$ and/or the diode $D_{41}$ can block a leakage current flowing from the battery cells $Cell_1$ and $Cell_2$ to the capacitor $C_C$. Thus, the switch circuits $Q_{N32}$-$D_{31}$ and $Q_{N42}$-$D_{41}$ can be protected from being damaged by the leakage current.

Figure 3B:
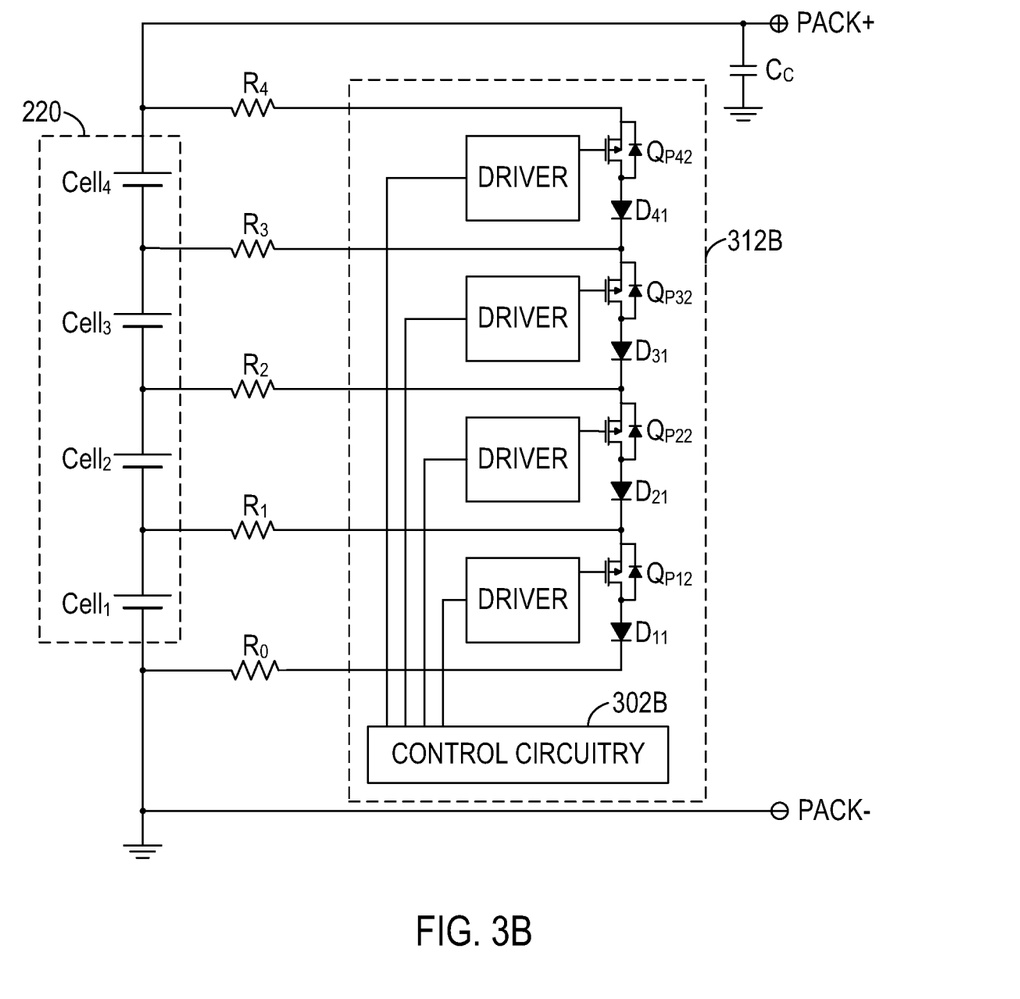
FIG. 3B illustrates a circuit diagram of an example of a balance circuit for a set of battery cells in a battery pack, in an embodiment of the present invention.

In the example of FIG. 3A, each of the switch circuits includes an n-channel MOSFET and a diode. However, the invention is not so limited. In another embodiment, each of the switch circuits includes a p-channel MOSFET and a diode, e.g., as shown in FIG. 3B. Operations and functions of the balance circuit 312B in FIG. 3B are similar to that of the balance circuit 312A in FIG. 3A.

Figure 4:
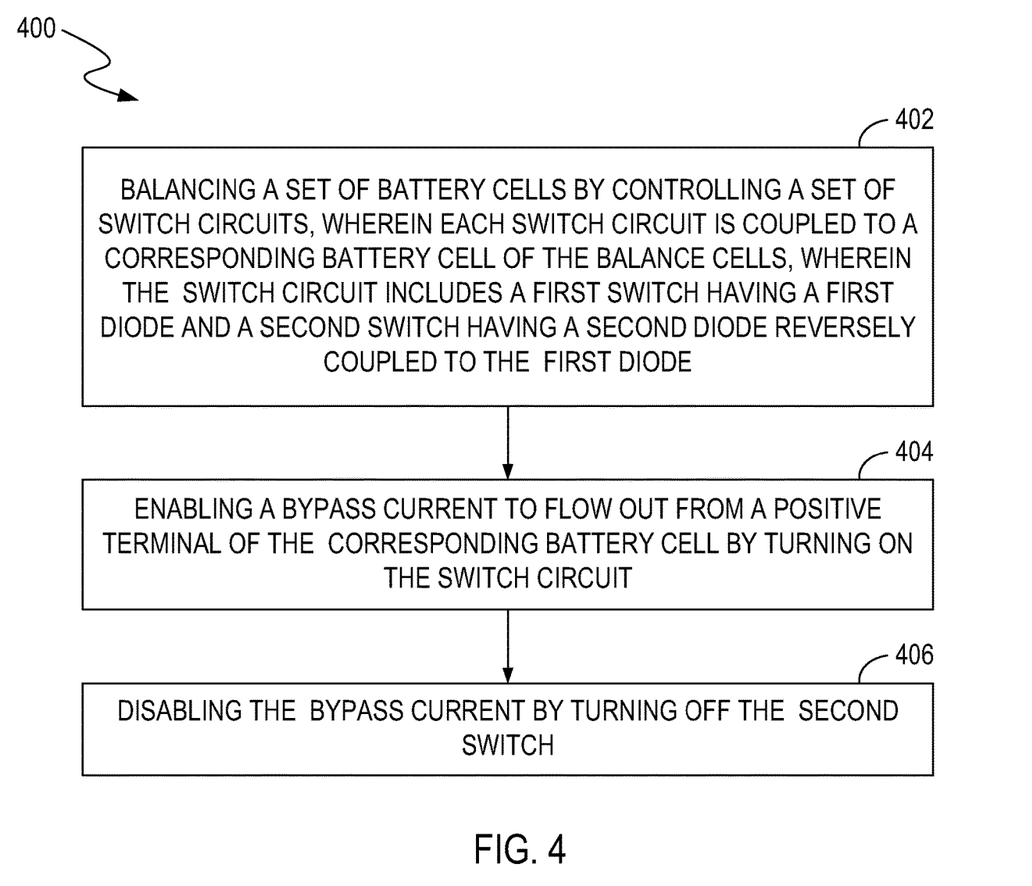
FIG. 4 illustrates a flowchart of examples of operations performed by a balance circuit for a set of battery cells, in an embodiment of the present invention.

FIG. 4 illustrates a flowchart 400 of examples of operations performed by a balance circuit for a set of battery cells, in an embodiment of the present invention. FIG. 4 is described in combination with FIG. 2A, FIG. 2B, FIG. 2C, FIG. 2D, FIG. 3A and FIG. 3B. Although specific steps are disclosed in FIG. 4, such steps are examples for illustrative purposes. That is, embodiments according to the present invention are well suited to performing various other steps or variations of the steps recited in FIG. 4.

At step 402, the control circuitry (e.g., 202A, 202B, 202C, 202D, 302A or 302B) balances a set of battery cells 220 by controlling a set of switch circuits (e.g., $Q_{N11}$-$Q_{N12}$, $Q_{N21}$-$Q_{N22}$, $Q_{N31}$-$Q_{N32}$, and $Q_{N41}$-$Q_{N42}$ in FIG. 2A; $Q_{N12}$-$Q_{N11}$, $Q_{N22}$-$Q_{N21}$, $Q_{N32}$-$Q_{N31}$, and $Q_{N42}$-$Q_{N41}$ in FIG. 2B; $Q_{P11}$-$Q_{P12}$, $Q_{P21}$-$Q_{P22}$, $Q_{P31}$-$Q_{P32}$, and $Q_{P41}$-$Q_{P42}$ in FIG. 2C; $Q_{P12}$-$Q_{P11}$, $Q_{P22}$-$Q_{P21}$, $Q_{P32}$-$Q_{P31}$, and $Q_{P42}$-$Q_{P41}$ in FIG. 2D; $Q_{N12}$-$D_{11}$, $Q_{N22}$-$D_{21}$, $Q_{N32}$-$D_{31}$, and $Q_{N42}$-$D_{41}$ in FIG. 3A; or $D_{11}$-$Q_{P12}$, $D_{21}$-$Q_{P22}$, $D_{31}$-$Q_{P32}$, and $D_{41}$-$Q_{P42}$ in FIG. 3B). Each switch circuit of the switch circuits is coupled to a corresponding battery cell of the battery cells. In an embodiment, each switch circuit includes a first switch having a first diode, and also includes a second switch having a second diode reversely coupled to the first diode. In an embodiment, the control circuitry balances the battery cells 220 by enabling or disabling a bypass current of a battery cell of the battery cells 220.

For example, at step 404, the control circuitry, e.g., 202A in FIG. 2A, can enable a bypass current $I_{BY}$ to flow from a positive terminal of the battery cell $Cell_1$ by turning on the switch circuit $Q_{N11}$-$Q_{N12}$.

At step 406, the control circuitry 202A can disable the bypass current $I_{BY}$ by turning off the second switch $Q_{N11}$ or turning off the switches $Q_{N11}$ and $Q_{N12}$.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

I claim:

1. A balance circuit for a plurality of battery cells, said balance circuit comprising:
   a plurality of switch circuits comprising a switch circuit coupled to a corresponding battery cell of said plurality of battery cells, said corresponding battery cell having a positive terminal and a negative terminal, said switch circuit operable for enabling a bypass current to flow from said positive terminal of said corresponding battery cell if said switch circuit is turned on, wherein said switch circuit comprises a first metal-oxide-semiconductor field-effect transistor (MOSFET) having a first diode, a first terminal and a second terminal, and also comprises a second MOSFET having a second diode, a third terminal and a fourth terminal, wherein said first terminal of said first MOSFET is coupled to said third terminal of said second MOSFET through a connection node, wherein said second diode is reversely coupled to said first diode through said connection node, and wherein said second MOSFET is configured to disable said bypass current if said second MOSFET is turned off;
   a plurality of resistors coupled to said switch circuits and said battery cells, wherein said second terminal of said first MOSFET is coupled to a terminal of said positive and negative terminals of said corresponding battery cell through a first resistor of said resistors, and wherein said fourth terminal of said second MOSFET is coupled to the other terminal of said positive and negative terminals of said corresponding battery cell through a second resistor of said resistors; and
   control circuitry, coupled to said switch circuits, operable for balancing said battery cells by controlling said switch circuits.

2. The balance circuit of claim 1, wherein an anode of said first diode and an anode of said second diode are coupled to said connection node.

3. The balance circuit of claim 2, wherein said connection node comprises a connection node between a source of said first MOSFET and a source of said second MOSFET.

4. The balance circuit of claim 1, wherein a cathode of said first diode and a cathode of said second diode are coupled to said connection node.

5. The balance circuit of claim 1, wherein said control circuitry is configured to monitor a status of said battery cells, and wherein if said control circuitry detects that said corresponding battery cell has a cell voltage greater than a balance reference, then said control circuitry is configured to turn on said switch circuit by turning on said first MOSFET and said second MOSFET.

6. The balance circuit of claim 1, wherein said battery cells are coupled in series.

7. A method comprising:
   balancing a plurality of battery cells by controlling a plurality of switch circuits, wherein a switch circuit of said plurality of switch circuits is coupled to a corresponding battery cell of said battery cells, wherein said switch circuit comprises a first metal-oxide-semiconductor field-effect transistor (MOSFET) having a first diode, a first terminal and a second terminal, and also comprises a second MOSFET having a second diode, a third terminal and a fourth terminal, wherein said first terminal of said first MOSFET is coupled to said third terminal of said second MOSFET through a connection node, wherein said second diode is reversely coupled to said first diode through said connection node, wherein said corresponding battery cell comprises a positive terminal and a negative terminal, wherein said second terminal of said first MOSFET is coupled to a terminal of said positive and negative terminals of said corresponding battery cell through a first resistor, wherein said fourth terminal of said second MOSFET is coupled to the other terminal of said positive and negative terminals of said corresponding battery cell through a second resistor, and wherein said balancing comprises:
      enabling a bypass current to flow from said positive terminal of said corresponding battery cell by turning on said switch circuit; and
      disabling said bypass current by turning off said second switch.

8. The method of claim 7, wherein an anode of said first diode and an anode of said second diode are coupled to said connection node.

9. The method of claim 8, wherein said connection node comprises a connection node between a source of said first MOSFET and a source of said second MOSFET.

10. The method of claim 7, wherein a cathode of said first diode and a cathode of said second diode are coupled to said connection node.

11. The method of claim 7, further comprising:
    monitoring a status of said battery cells; and
    if said corresponding battery cell has a cell voltage greater than a balance reference, then turning on said switch circuit by turning on said first MOSFET and said second MOSFET.

12. The method of claim 7, wherein said battery cells are coupled in series.

13. The method of claim 12, wherein said battery cells are included in a battery pack having a capacitor coupled to a positive terminal of said battery pack, wherein said battery cells comprise a first battery cell and a second battery cell adjacent to said first battery cell, wherein said switch circuits comprise a first switch circuit coupled to said first battery cell, and wherein said method further comprises:

blocking a current from said second battery cell to said capacitor by turning off said first switch circuit.

14. A battery pack comprising:

a plurality of battery cells;

a plurality of switch circuits, wherein a switch circuit of said switch circuits is coupled to a corresponding battery cell of said battery cells, wherein said corresponding battery cell comprises a positive terminal and a negative terminal, wherein said switch circuit is operable for enabling a bypass current to flow from said positive terminal of said corresponding battery cell if said switch circuit is turned on, wherein said switch circuit comprises a first metal-oxide-semiconductor field-effect transistor (MOSFET) having a first diode, a first terminal and a second terminal, and also comprises a second MOSFET having a second diode, a third terminal and a fourth terminal, wherein said first terminal of said first MOSFET is coupled to said third terminal of said second MOSFET through a connection node, wherein said second diode is reversely coupled to said first diode through said connection node, and wherein said second MOSFET disables said bypass current if said second MOSFET is turned off;

a plurality of resistors coupled to said switch circuits and said battery cells, wherein said second terminal of said first MOSFET is coupled to a terminal of said positive and negative terminals of said corresponding battery cell through a first resistor of said resistors, and wherein said fourth terminal of said second MOSFET is coupled to the other terminal of said positive and negative terminals of said corresponding battery cell through a second resistor of said resistors; and control circuitry, coupled to said switch circuits, operable for balancing said battery cells by controlling said switch circuits.

15. The battery pack of claim 14, wherein an anode of said first diode and an anode of said second diode are coupled to said connection node.

16. The battery pack of claim 15, wherein said connection node comprises a connection node between a source of said first MOSFET and a source of said second MOSFET.

17. The battery pack of claim 14, wherein a cathode of said first diode and a cathode of said second diode are coupled to said connection node.

18. The battery pack of claim 14, wherein said control circuitry monitors a status of said battery cells, and wherein if said control circuitry detects that said corresponding battery cell has a cell voltage greater than a balance reference, then said control circuitry turns on said switch circuit by turning on said first MOSFET and said second MOSFET.

19. The battery pack of claim 14, wherein said battery cells are coupled in series.

20. The battery pack of claim 19, further comprising a capacitor coupled to a positive terminal of said battery pack, wherein said battery cells comprise a first battery cell and a second battery cell adjacent to said first battery cell, and wherein said switch circuits comprise a first switch circuit, coupled to said first battery cell, and operable for blocking a current from said second battery cell to said capacitor if said first switch circuit is turned off.

* * * * *